United States Patent [19]

Uhlmann

[11] 4,130,938
[45] Dec. 26, 1978

[54] CUTTER FOR ANIMAL HOOVES AND CLAWS

[75] Inventor: Georg Uhlmann, Bendorf, Germany

[73] Assignee: Rheintechnik Weiland & Kaspar K.G., Neunkirchen, Germany

[21] Appl. No.: 703,935

[22] Filed: Jul. 9, 1976

Related U.S. Application Data

[63] Continuation-in-part of Ser. No. 513,514, Oct. 9, 1974, abandoned.

[30] Foreign Application Priority Data

Oct. 11, 1973 [DE] Fed. Rep. of Germany ....... 2350999

[51] Int. Cl.² ..................... B26B 17/00; A01L 11/00
[52] U.S. Cl. ..................................... 30/192; 168/48 R
[58] Field of Search .................... 168/45–48; 30/175, 191, 192 X, 193, 252; 81/359, 360, 364, 366 X, 348; 7/5.2, 5.5

[56] References Cited

U.S. PATENT DOCUMENTS

| | | | |
|---|---|---|---|
| 476,459 | 6/1892 | Hamann et al. | 30/252 |
| 1,455,297 | 5/1923 | Lyons et al. | 30/192 |
| 2,955,624 | 10/1960 | Ferm | 81/348 |
| 2,963,053 | 12/1960 | Ferm | 81/348 |
| 3,638,307 | 2/1972 | Stewart | 30/193 |

Primary Examiner—Russell R. Kinsey
Assistant Examiner—Robert P. Swiatek
Attorney, Agent, or Firm—Michael J. Striker

[57] ABSTRACT

A plier has a pair of arms each composed of a jaw portion and a handle portion, and the jaw portions carry respective cutting elements. The arms are pivoted together so that when the handle portions are moved towards one another the jaw portions also move towards one another, and vice versa. Interengaging toothed racks are provided on the handle and jaw portions of the arms in the region where they are pivoted together and cooperate with one another to form a reduction gear.

10 Claims, 2 Drawing Figures

FIG.1
FIG.2
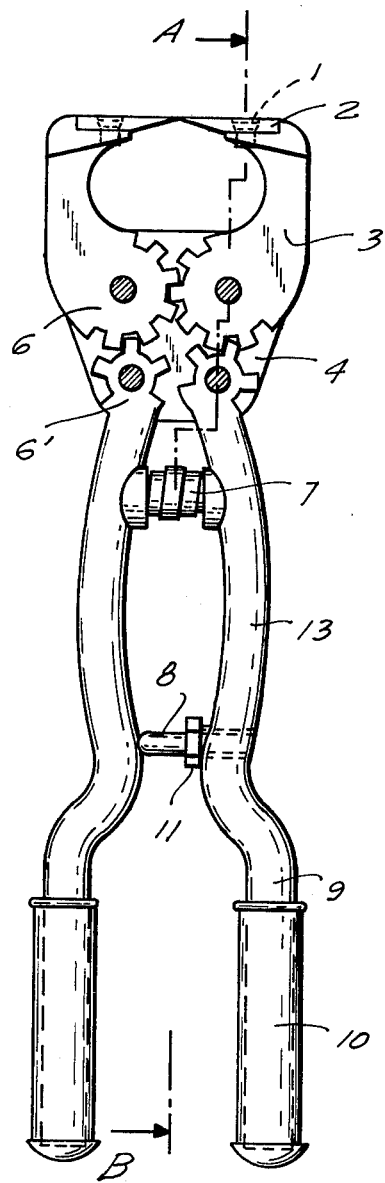
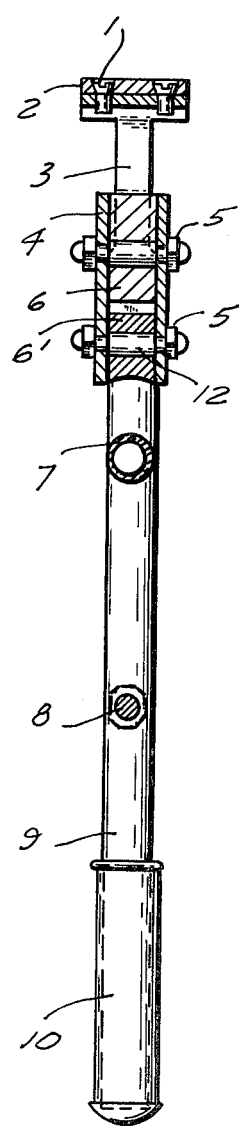

CUTTER FOR ANIMAL HOOVES AND CLAWS

This is a continuation-in-part of application Ser. No. 513,514, filed Oct. 9, 1974, and now abandoned.

BACKGROUND OF THE INVENTION

The present invention relates generally to a cutter, and more particularly but not exclusively to a cutter which is especially suited for cutting of animal hooves and claws.

Cutters of this type are used to cut the hooves or claws of large animals, for example of cows. The prior-art cutters of this type have jaws provided with cutting blades or the like which are moved towards and away from one another when handles of the cutter are manually operated by a user. The movement of the handles is transmitted to the jaws via linkage arrangements which, however, are incapable of producing the desired high pressure upon the cutting blades, and which have also been found to be subject to a high-degree of wear so that after a relatively short period of use the cutter will no longer properly operate.

SUMMARY OF THE INVENTION

Accordingly, it is a general object of the present invention to provide an improved cutter which avoids the disadvantages of the prior art.

More particularly, it is an object of the present invention to provide such an improved cutter which is especially suitable for cutting of animal hooves and claws.

An additional object of the present invention is to provide such a cutter which affords a high degree of force transmission between the handles and the cutting blades, and which thus offers a better cutting effect.

Another object of the invention is to provide such a cutter in which wear of the components is fully or substantially fully eliminated.

In keeping with these objects and with others which will become apparent hereafter, one feature of the invention resides in a cutter, particularly for animal hooves and claws, which comprises a plier having a pair of arms each composed of a jaw portion and a handle portion, and cutting elements carried by the respective jaw portions. Pivot means pivotally connects the arms for movement of the jaw portions towards one another as the handle portions are moved towards one another and vice versa. Interengaging toothed racks are provided on the handle and jaw portions of the arms in the region of the pivot means and cooperate with one another to form a reduction gear.

This construction, and particularly the position of the racks which constitute a reduction gear, provides for a substantial improvement in the degree of force which can be transmitted from the handled portions to the jaw portions and hence the cutting arms, and thus offers a better cutting effect. Moreover, while the prior-art cutters require two-handed operation on the part of the user, the cutter according to the present invention can actually be operated with only one hand.

The wear of the interengaging toothed racks is extremely small, and in no way comparable to the amount of wear that is experienced in the lever linkages of the prior-art cutters, so that as the result of this lack of wear in the cutter according to the present invention, the cutting elements will always be precisely oriented with reference to one another as they are when the cutter is completely new, thus assuring an improved cutting efficiency and cutting accuracy.

It is particularly advantageous if a helical spring is located between the handle portions, being carried by them and bearing upon both of them, so as to push the handle portions apart from one another when they approach one another beyond a certain extent. This assures that the cutter can be reliably operated with only one hand, because the handle portions will always be pushed apart to operative position.

It is also advantageous if the toothed racks are covered at opposite sides of the plier with cover plates, because these plates protect the racks against damage and also against the entry of undue amounts of dirt and other contaminants. Furthermore, such cover plates prevent the accidental engagement of the fingers or other portions of the hands of a user, and thus constitute a safeguard against accidents.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

BRIEF DESCRIPTION OF THE DRAWING

FIG. 1 is a plan view of the novel cutter according to the present invention, with the cover plate which faces upwardly in this view having been removed for the sake of better illustration; and FIG. 2 is a section taken on line A–B of FIG. 1.

DESCRIPTION OF THE PREFERRED EMBODIMENTS

Referring now to the drawing in detail, which shows a single exemplary embodiment in FIGS. 1 and 2, it will be seen that reference numeral 3 identifies a pair of jaw portions each of which forms together with a handle portion 9 an arm of the plier-type cutter. It should be noted that the jaw portions 3 and the handle portion 9 of each arm are, however, separate from one another. The free ends of the jaw portions 3 carry respective cutting elements in form of blades 2 which are mounted on them by means of screws 1. The ends of the jaw portions 3 which are remote from the free ends carrying the blades 2, are formed with toothed racks or segments 6. The ends of the handle portions 9 which are adjacent the jaws 3 are in turn formed with toothed racks or segments 6' which interengage and mesh with the respective toothed segments 6 and form with them a reduction gear. The desired reduction is achieved in that the number of teeth on the toothed segments 6' is smaller than the number of teeth on the toothed segments 6.

An adjusting screw 8 is provided which makes it possible to precisely adjust the position of the blades 2 with reference to one another. In other words, the adjusting screw 8 permits an adjustment of the maximum spacing (or lack thereof) of the cutting edges of the blades 2 when these cutting edges have approached one another to the maximum possible extent. To prevent an undesired loosening and shifting of the screw 8, the latter is fixable in its selected position by means of a counter nut 11.

A pair of cover plates 4 is provided at opposite sides of the plier-type cutter, as particularly clearly shown in FIG. 2, but also evident from FIG. 1, where, however, the upwardly facing cover plate 4 has been removed for the sake of better illustration. The plates 4 serve to cover the toothed segments 6, 6' at opposite sides so as to protect them against the entry of contaminants and against damage, and at the same time to prevent the possibility of injury to a user. The plates 4 are held in place by pivot pins 12 which extend through the respective rack segments 6, 6' and are threaded at their opposite ends, which ends extend through the plates 4 and have nuts 5 such as cap nuts, threaded onto them.

Located between the handle portions 9, which advantageously are bowed in the region 13 approximately midway intermediate the opposite ends of the plier-type cutter, is a helical spring 7, preferably wound of a spring steel strip, and this spring 7 may be carried on one of the handle portions 9 and engage the other one, or it may be connected to both of the handle portions 9. In any case, it permanently tends to push the handle portions 9 apart from one another, so that under all circumstances these handle portions will move apart to operative position, thus readily permitting one-handed use of the cutter. This one-handed use is also further facilitated by the position of the bowed portions 13. Reference numeral 10 identifies hand grips, for instance rubber sleeves or the like, which are placed over the free ends of the handle portions 9.

It will be understood that each of the elements described above, or two or more together, may also find a useful application in other types of constructions differing from the types described above.

While the invention has been illustrated and described as embodied in a cutter, it is not intended to be limited to the details shown, since various modifications and structural changes may be made without departing in any way from the spirit of the present invention.

Without further analysis the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A cutter, particularly for animal hooves and claws, comprising a pair of jaw sections, each having a first end portion defining a first gear member; a cutting element mounted on each of said jaw sections and arranged to cooperate with one another so as to permit severing of articles placed between said jaw sections; a pair of handle sections for activating said jaw sections and each having a second end portion defining a second gear member; and mounting means mounting said jaw sections for pivotal movement relative to one another so that each of said first gear members is arranged for interengagement with the other first gear member, and each of said second gear members is arranged for interengagement only with a respective one of said first gear members while being free of interengagement with the respective other second gear member.

2. A cutter as defined in claim 1, comprising spring means located between said handle sections and adapted to urge the same away from one another.

3. A cutter as defined in claim 2, wherein said spring means comprises a helical spring bearing upon both of said handle sections.

4. A cutter as defined in claim 1, wherein said handle sections are of bowed configuration.

5. A cutter as defined in claim 4, wherein said handle sections are bowed substantially midway between the opposite longitudinal ends of said cutter.

6. A cutter as defined in claim 1, comprising adjusting means for adjusting the relative positions of said cutting elements.

7. A cutter as defined in claim 1, comprising means detachably connecting said cutting elements with the respective jaw sections.

8. A cutter as defined in claim 1, wherein said mounting means include cover plates, said jaw sections and said handle sections being pivotally mounted on said cover plates.

9. A cutter as defined in claim 8, wherein said cover plates overlie and cover said gear members.

10. A cutter as defined in claim 1, wherein the pairs of interengaging first and second gear members constitute reduction gear means.

* * * * *